(12) United States Patent
Hudson et al.

(10) Patent No.: US 6,545,631 B2
(45) Date of Patent: Apr. 8, 2003

(54) INTEGRATED DATALINKS IN A SURVEILLANCE RECEIVER

(75) Inventors: Craig William Hudson, Amity, OR (US); John Thomas Pratt, Salem, OR (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/981,677

(22) Filed: Oct. 17, 2001

(65) Prior Publication Data

US 2002/0075179 A1 Jun. 20, 2002

Related U.S. Application Data (60) Provisional application No. 60/241,255, filed on Oct. 17, 2000.

(51) Int. Cl.$^7$ ................................................ G01S 13/93
(52) U.S. Cl. ............................ 342/30; 342/32; 342/36; 342/37; 342/42; 342/46
(58) Field of Search ............................ 342/29, 30, 31, 342/32, 36, 37, 42, 46, 50

(56) References Cited

U.S. PATENT DOCUMENTS

| | | | | |
|---|---|---|---|---|
| 5,570,095 A | * | 10/1996 | Drouilhet, Jr. et al. | . 342/357.07 |
| 6,124,825 A | * | 9/2000 | Eschenbach | 342/357.08 |
| 6,195,609 B1 | * | 2/2002 | Piley et al. | 701/120 |
| 6,433,729 B1 | * | 8/2002 | Staggs | 342/29 |
| 6,459,411 B2 | * | 10/2002 | Frazier et al. | 342/455 |
| 2002/0011950 A1 | * | 1/2002 | Frazier et al. | 342/357.08 |
| 2002/0075171 A1 | * | 6/2002 | Kuntman et al. | 340/961 |
| 2002/0075179 A1 | * | 6/2002 | Hudson | 342/30 |
| 2002/0089432 A1 | * | 7/2002 | Staggs et al. | 340/945 |
| 2002/0154061 A1 | * | 10/2002 | Frazier, Jr. et al. | 342/455 |

FOREIGN PATENT DOCUMENTS

| | | | | |
|---|---|---|---|---|
| WO | WO-200205454 A | * | 1/2002 | |

* cited by examiner

*Primary Examiner*—John B. Sotomayor
(74) *Attorney, Agent, or Firm*—Alston & Bird LLP (57) ABSTRACT

A surveillance transceiver system is provided for receiving extended squitters from Mode S transponders, translating the squitters into ADS-B state vectors in UAT format, and transmitting the ADS-B state vectors using a Universal Access Transceiver (UAT) datalink. The surveillance transceiver system bridges the gap created by differently-equipped aircraft by using multiple datalinks to provide seamless ADS-B surveillance. The module for processing the extender squitters includes a 1090 MHz receiver and a computer processor in communication with the UAT processor for parsing the squitter and composing the ADS-B state vector in UAT format for broadcast.

39 Claims, 3 Drawing Sheets

FIG 3

INTEGRATED DATALINKS IN A SURVEILLANCE RECEIVER

RELATED APPLICATIONS

This application claims the benefit and priority of pending Provisional Application bearing Serial No. 60/241,255, filed Oct. 17, 2000, which is incorporated herein by reference.

TECHNICAL FIELD

The present invention relates generally to the field of avionics and surveillance transceiver systems. More particularly, the invention relates to a method, apparatus, system, and computer software product for receiving and translating ADS-B messages from Mode S format to UAT format for broadcast using a Universal Access Transceiver.

BACKGROUND OF THE INVENTION

Historically, the air traffic control system has relied upon a network of ground-based radar stations and a transponder onboard each aircraft. In response to a radar beacon interrogation from a ground station, the transponder broadcasts a response. The transponder signal provides the air traffic controller with very basic information about the aircraft. The transponder transmits a four-digit octal code and the ownership altitude. The aircraft position is inferred by measuring the time of reception and the angular position of the radar dish.

The Mode Select Beacon (Mode S) system was developed to add a unique identifier called an ICAO aircraft address to the radar beacon interrogation and to the transponder's responsive signal. ICAO is the International Civil Aviation Organization, a body that promulgates standards for civil aviation. Because a Mode S interrogation is addressed to a specific aircraft, only the Mode S transponder onboard that particular aircraft will respond. The Mode S system is sometimes called the Mode S datalink.

The Automatic Dependent Surveillance—Broadcast (ADS-B) system was developed to take advantage of the satellite-based Global Positioning System (GPS) to directly transmit aircraft latitude and longitude without using ground-based radar interrogations. The GPS-based position data is updated continuously, is highly accurate, and does not require the typical transponder interrogation. An aircraft equipped with ADS-B automatically and periodically broadcasts a digital signal to all other ADS-B-equipped aircraft. The ADS-B signal contains extensive information about the aircraft's position and heading as well as the integrity of such information.

The Federal Aviation Administration initiated the Capstone Program, a project designed to improve civil aviation safety and efficiency through the use of GPS-based avionics and datalink communications. Under the Capstone Program, certain commercial and government aircraft in the Alaska testing region were equipped with ADS-B systems. A network of ground-based transceivers capable of receiving and transmitting ADS-B signals were also installed in the testing region.

Ground-based and mobile transceivers with internal signal processors are used to receive and transmit ADS-B signals. A transceiver is capable of both receiving and transmitting signals. The Universal Access Transceiver (UAT) is a radio datalink system that supports ADS-B and other broadcast services. The UAT datalink provides communication between ADS-B-equipped aircraft and ground stations.

In addition to receiving and transmitting ADS-B signals from aircraft, the UAT datalink system is capable of uplinking and broadcasting data from fixed ground radar stations in two modes: FIS-B (Flight Information Services—Broadcast) mode and TIS-B (Traffic Information Services—Broadcast) mode. FIS-B data includes a wide variety of information, including weather broadcasts (graphical and text), airport status reports, temporary airspace restrictions, and official Notices to Airmen called NOTAMs. TIS-B data includes information about air traffic gathered from ground-based radar systems.

The RTCA, an organization that promulgates consensus-based aviation standards, is developing a standard format for messages transmitted via a UAT datalink system. This UAT format requires the data to be in a certain order. An ADS-B signal can be broadcast on a UAT datalink system if the signal is placed in the standard UAT format.

An ADS-B signal can also be broadcast on a Mode S datalink. The ADS-B signal from a Mode S datalink is called a Mode S extended squitter. The UAT datalink, however, is not equipped to receive or transmit Mode S extended squitters.

While many small planes and commuter jets are equipped with radar transponders, they are not equipped to broadcast Mode S extended squitters. Similarly, while most commercial airliners are equipped with Mode S transponders, most are not equipped to broadcast signals in UAT format. Accordingly, a mixture of equipment onboard different aircraft will remain a challenge for air traffic control and monitoring systems.

Thus, there is a need for a transceiver system that is capable of receiving a Mode S extended squitter and transmitting the data contained within the squitter in UAT format to ADS-B-equipped aircraft, vehicles, and stations. There is a related need for computer software to translate a Mode S extended squitter into a transmittable UAT-format ADS-B signal.

There is also a need for a device that will facilitate interoperability between and among the various types of avionics communication equipment in use today.

There is a further need for a single surveillance device capable of receiving Mode S extended squitters from aircraft and traffic data from fixed ground radar stations, and further capable of transmitting the data in an ADS-B-compatible format using a Universal Access Transceiver radio datalink system.

SUMMARY OF THE INVENTION

The above and other needs are met by the present invention which, in one embodiment, generally provides an apparatus, a method, and a system for receiving extended squitters from Mode S transponders, translating the squitters into ADS-B state vectors, and transmitting the ADS-B state vectors using a transceiver system. The transceiver system integrates transponder datalink technology and ADS-B datalink technology in a single surveillance receiver.

In one aspect of the present invention, the apparatus for processing a squitter includes a receiver capable of receiving the squitter in a first format from a vehicle, a processor configured to translate the squitter into a new transmittable ADS-B signal in a second format, and a transmitter. In one embodiment, the squitter is an extended squitter made up of several segments broadcast by a Mode S transponder. In one embodiment, the transmittable ADS-B signal is an ADS-B state vector in UAT format composed according to existing standards.

In one embodiment, the processor may include several processors connected to one another and connected to the receiver and the transmitter. The processor or processors may also be configured to control the receipt and transmission of traffic data from fixed ground radar stations.

In one embodiment, the transmitter is a transceiver, capable of receiving and transmitting signals in a second format. Where such a transceiver is present, the processor is configured to suspend translation of a squitter received from a target when a signal having the second format is also received from the same target. In one embodiment, the transmitter is a Universal Access Transceiver (UAT) and the processor suspends translation of incoming signals that are in UAT format.

In another aspect of the invention, the apparatus for translating a squitter into an ADS-B signal in UAT format includes a squitter receiver and a processor. The processor is configured to parse the squitter into its component data and then use the data to compose an ADS-B state vector. In one embodiment, the parsed data may be stored in a track file.

In another aspect, a method for processing a squitter generally includes the steps of receiving the squitter from a vehicle via a receiver, translating the squitter into a transmittable ADS-B signal using a processor, and transmitting the ADS-B signal in UAT format via a transmitter. The step of translating, in one embodiment, includes parsing the squitter into its component data and composing the new ADS-B signal using the data. In one embodiment, the step of parsing the squitter includes storing the data in track file.

In an embodiment where the transmitter is a transceiver capable of receiving and transmitting UAT signals, the method of the present invention also includes the step of suspending the translation of a squitter received from a target when an UAT signal is also received from the same target.

In another aspect, the method of translating a squitter within a transceiver system includes the steps of receiving the squitter, parsing the squitter into its component data, composing a new ADS-B signal from the data, and transmitting the ADS-B signal. The parsing and composing steps may be accomplished in one or more processors, alone or in cooperation with one another.

In another aspect of the invention, a system for processing a squitter includes a vehicle equipped with an onboard transmitter, a receiver configured to receive the squitter from the onboard transmitter, a computer processing device, and a transmitter. The computer device includes a first processing portion to parse the squitter into its component data and a second portion to compose a new ADS-B signal using the data.

In one embodiment, the system includes several computer devices that may work in tandem to execute the first and second processing portions. In one embodiment, the computer device includes a third processing portion to compose the new ADS-B signal in UAT format. In an embodiment where the transmitter is a transceiver, the computer device also includes a fourth processing portion to suspend translation of a squitter received from a target when a UAT signal is also received from said target.

In another embodiment of the system, the computer device also includes a traffic processing portion to receive traffic data from fixed ground radar stations and a broadcast processing portion to direct the transmitter to transmit said traffic data.

In another aspect, the invention includes computer software for translating a squitter into an ADS-B signal in UAT format. The software is designed to operate within a system having a transceiver component. The software includes a first executable portion to parse the squitter into its component data and a second portion to compose the ADS-B signal from the data.

In one embodiment, the first executable portion includes a sub-portion to store the data in a track file. In one embodiment where the transmitter is a transceiver, the software also includes a third executable portion to suspend translation of a squitter received from a target when a UAT signal is also received from said target.

In yet another aspect of the present invention, a squitter translator is integrated into an existing transceiver system. The squitter translator includes a squitter receiver and a squitter processor. The squitter processor is linked to the transceiver system such that the squitter in a first format is translated into an ADS-B signal in a second format suitable for broadcast by the transceiver system.

In another aspect, the present invention includes a translator module for use with an existing transceiver system. The module includes a receiver and a squitter processor. The squitter processor is designed to be connected for data communication to the transceiver system. The squitter processor translates the squitter in a first format into a new ADS-B signal in a second format that is compatible with the transceiver. In one embodiment, the squitter processor parses the squitter into its component data and then composes the ADS-B signal using the data.

Thus, it is an object of the present invention to provide an apparatus for translating Mode S extended squitters into ADS-B signals in UAT format. It is a related object of the present invention to provide a system for receiving squitters from transponders, for translating the squitters into ADS-B state vectors, and for transmitting the ADS-B state vectors in UAT format using a UAT datalink system.

It is a further object of the present invention to provide an apparatus and a transceiver system that is capable of receiving a Mode S extended squitter and transmitting the data contained within the squitter to ADS-B-equipped aircraft in a compatible format. It is a related object of the present invention to provide processors and computer software to translate the Mode S squitter into a transmittable ADS-B signal in UAT format.

It is also an object of the present invention to provide a single surveillance device capable of receiving Mode S squitters, ADS-B signals, and traffic data from fixed ground radar stations, and further capable of transmitting the data in an ADS-B-compatible format using a universal access transceiver radio datalink system. It is a related object of the present invention to facilitate interoperability between and among the various types of avionics communication equipment.

These and other objects accomplished by the present invention will become apparent from the following detailed description of one preferred embodiment in conjunction with the accompanying drawings.

DETAILED DESCRIPTION OF THE DRAWINGS

Figure 1:
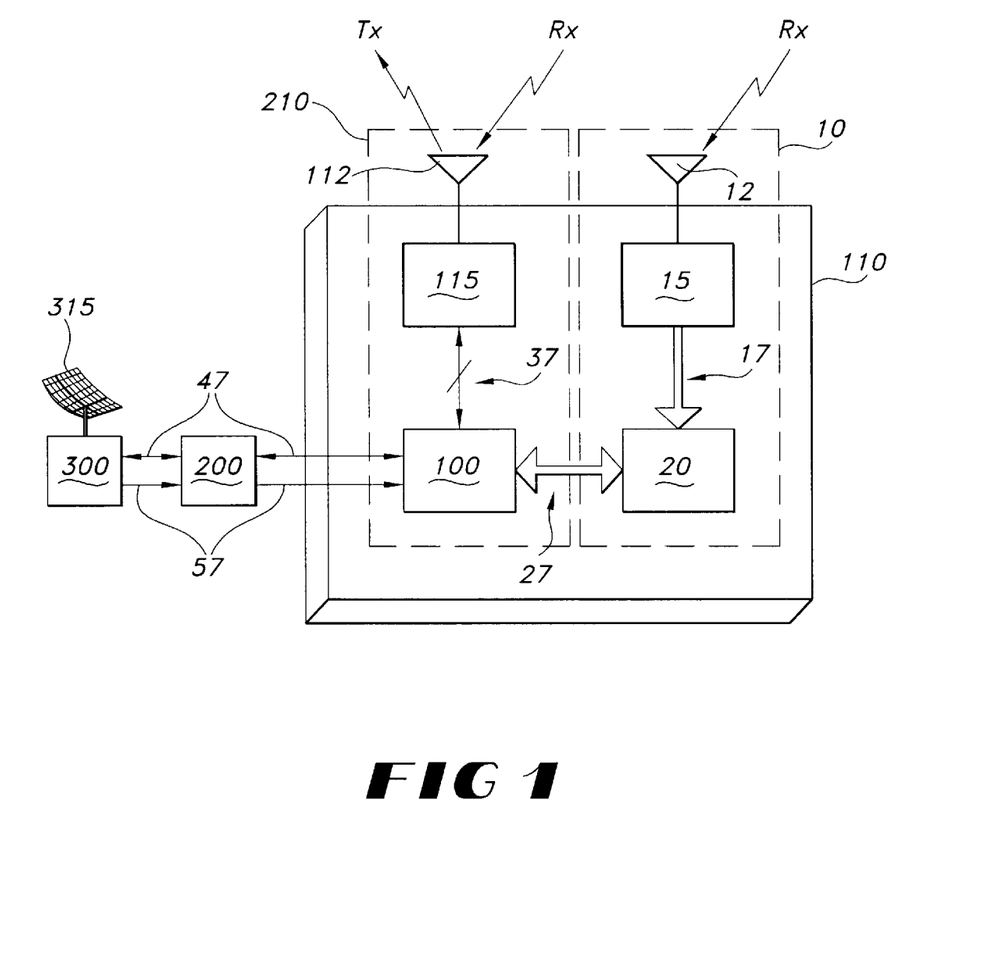
FIG. 1 is a diagrammatic view of a transceiver system according to an embodiment of the present invention.

Referring now in more detail to the drawings, in which like numerals indicate like elements throughout the several views, FIG. 1 illustrates a ground-based transceiver system 110 which consists of a Universal Access Transceiver (UAT) system 210 and a module 10, according to an embodiment of the present invention. The UAT system 210 provides a radio datalink for ADS-B signals, FIS-B signals, and TIS-B signals. With the module 10 installed, the transceiver system 110 of the present invention is additionally capable of providing a radio datalink for transmitting the data contained within Mode S extended squitter signals to vehicles equipped with a UAT datalink system. Although position signals are generally described in this application as being received from and transmitted to aircraft, it should be understood that the present invention can be used to process signals from any type of vehicle or station and to broadcast signals to any type of properly-equipped vehicle or station.

Although FIG. 1 shows a ground-based transceiver system 110, it should be understood that the present invention can also utilize airborne transceiver systems.

The Universal Access Transceiver System 210

The UAT system 210 is capable of receiving and transmitting ADS-B signals from aircraft. It should be understood that the present invention may be practiced using transceivers having transceiver formats different from the UAT format.

The UAT system 210 generally includes a transceiver 115 connected by a serial connection 37 to a first processor 100. The serial connection 37 enables the transceiver 115 to be in communication with the first processor 100. The transceiver 115 includes an antenna 112 that is configured to receive and transmit signals. The arrows labeled Rx indicates a signal being received. The arrow labeled Tx represents a signal being transmitted.

The UAT system 210 is also capable of uplinking and broadcasting data from fixed ground radar stations in two well-known modes: FIS-B (Flight Information Services— Broadcast) mode and TIS-B (Traffic Information Services— Broadcast) mode. The first processor 100 of the UAT system 210 is in communication with one or more air traffic control centers 300 via a link that may or may not include one or more intermediate computer servers 200. Information received from FAA weather processing systems, Flight Service Stations, and weather specialists in Air Traffic Control is collectively referred to as FIS-B. The phrase, "traffic data from fixed ground radar stations" as it is used in this application includes both FIS-B and TIS-B.

The first processor 100 receives TIS-B signals from the air traffic control center 300 via a TIS-B link 47. Signals broadcast in TIS-B mode include information about air traffic from ground-based radar 315. TIS-B generally includes all the data used by air traffic controllers.

Additionally, the first processor 100 receives FIS-B signals from the air traffic control center 300 via an FIS-B link 57. Signals broadcast in FIS-B mode include a wide variety of information, including weather broadcasts (graphical and text), airport status reports, temporary airspace restrictions, uncharted obstacles, and official Notices to Airmen (NOTAMs).

The Module 10

In one aspect of the invention, the module 10 includes a receiver 15 connected by a one-way direct memory access connection 17 to a second processor 20. The connection 17 enables the receiver 15 to be in communication with the second processor 20. The receiver 15 includes a receive-only 1090 MHz antenna 12 that is configured to receive extended squitters from transponders. The second processor 20 of the module 10 of the present invention is connected by a direct memory access connection 27 to a first processor 100. The connection 27 enables the first processor 100 to be in communication with the second processor 20.

In one embodiment, as shown in FIG. 1, the module 10 of the present invention is configured to be installed within a UAT system 210. The module 10 in this embodiment may also be referred to as a squitter translator or a translator module. Together, the module 10 and the UAT system 210 form a transceiver system 110 capable of providing a radio datalink for ADS-B signals, FIS-B signals, and TIS-B signals.

Components suitable for use in practicing the present invention are available from UPS Aviation Technologies, Inc., of Salem, Oreg., including the AT7000 Mode S datalink transponder, the Apollo GBT2000 ADS-B datalink ground station, the Universal Access Transceiver (UAT), the AT2000 multi-function cockpit display of traffic information (CDTI), and the AT9000 link and display processing unit (LDPU). Moreover, technology suitable for use in practicing the present invention has been developed as part of the FAA Capstone Program, including onboard ADS-B systems, onboard cockpit displays, and ground-based transceiver systems.

Differently-Equipped Aircraft

In another aspect of the present invention, the transceiver system 110 enables communication between and among aircraft having different equipment. The UAT system 210 shown in FIG. 1, by itself, is not equipped to receive or transmit Mode S extended squitters broadcast by aircraft equipped with transponders.

It should be noted that UAT datalink systems 30 and Mode S transponders 40 (see FIG. 2) broadcast signals in different formats, containing different information. For example, a Mode S extended squitter 50 may be broadcast at a frequency of 1090 MHz, whereas a UAT-format ADS-B signal 35 may be broadcast at 978 MHz. A Mode S extended squitter 50 may contain ADS-B messages transmitted in multiple segments, whereas a UAT-format ADS-B signal 35 may be transmitted in a single unsegmented message.

Figure 2:
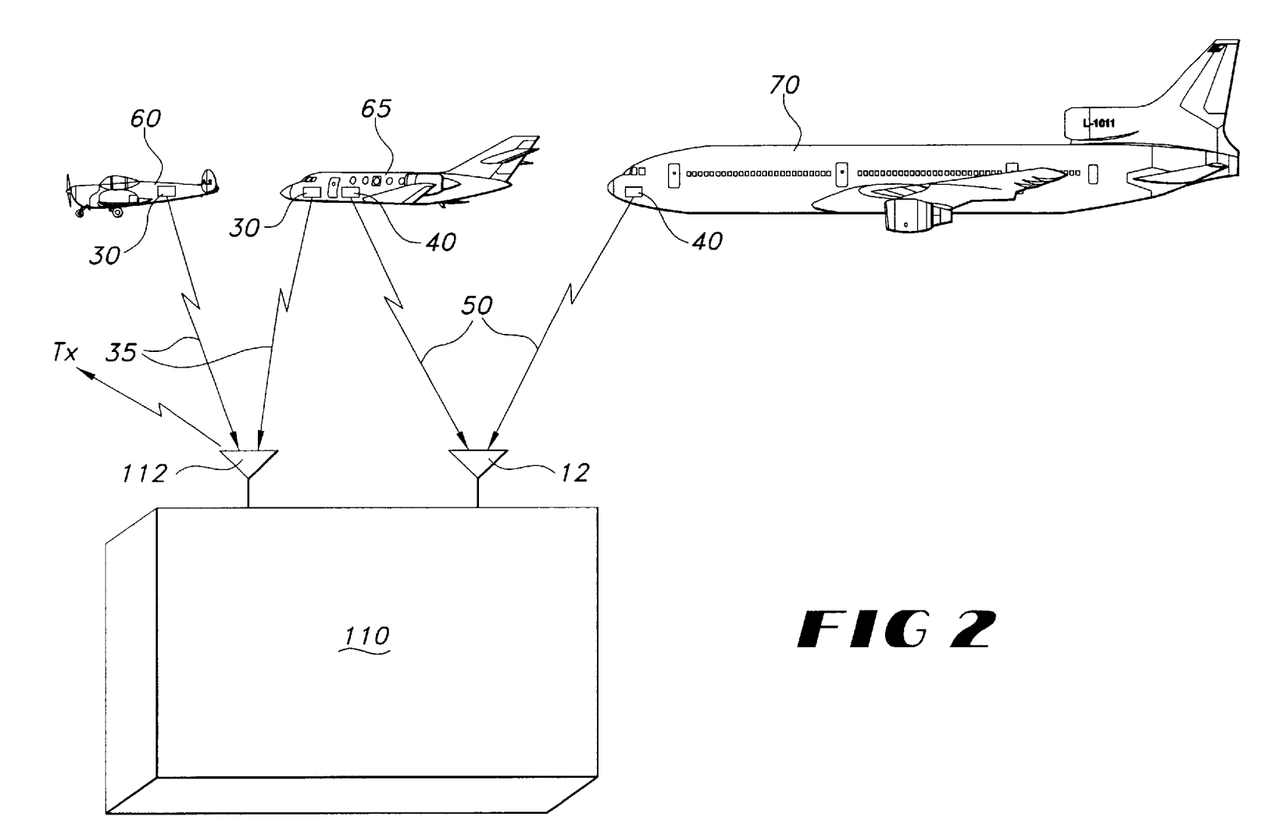
FIG. 2 is a diagrammatic view of differently-equipped aircraft in relation to a transceiver system, in accordance with an embodiment of the present invention.

As shown in FIG. 2, the transceiver system 110 of the present invention is capable of processing a UAT-format ADS-B signal 35 from a UAT-equipped aircraft 60. The antenna 112 of the transceiver 115 (shown in FIG. 1) is configured to receive UAT-format ADS-B signals 35.

Many small planes flown by private pilots can be economically equipped with a UAT datalink system 30. Many commuter jets and newer small planes, on the other hand, may adopt both a UAT datalink system 30 and a Mode S squitter transponder 40. These dual-equipped aircraft 65 broadcast a UAT-format ADS-B signal 35 and a Mode S extended squitter 50. The transceiver system 110 of the present invention is capable of processing both types of signals. The 1090 MHz antenna 12 of the receiver 15 (shown in FIG. 1) is configured to receive extended squitters 50.

The transceiver system 110 of the present invention is also capable of processing an extended squitter 50 from a transponder-equipped aircraft 70, such as a commercial passenger jet. The 1090 MHz antenna 12 of the receiver 15 (shown in FIG. 1) is configured to receive extended squitters 50. Many commercial jets are equipped with a Mode S transponder 40 that has been upgraded for extended squitter capability.

As shown in FIG. 1, the transceiver 115 includes an antenna 112 that is capable of both receiving and transmitting signals. A signal being received is labeled Rx. A signal being transmitted is labeled Tx.

Translation of the ADS-B Signal from Mode S Format to UAT Format

Figure 3:
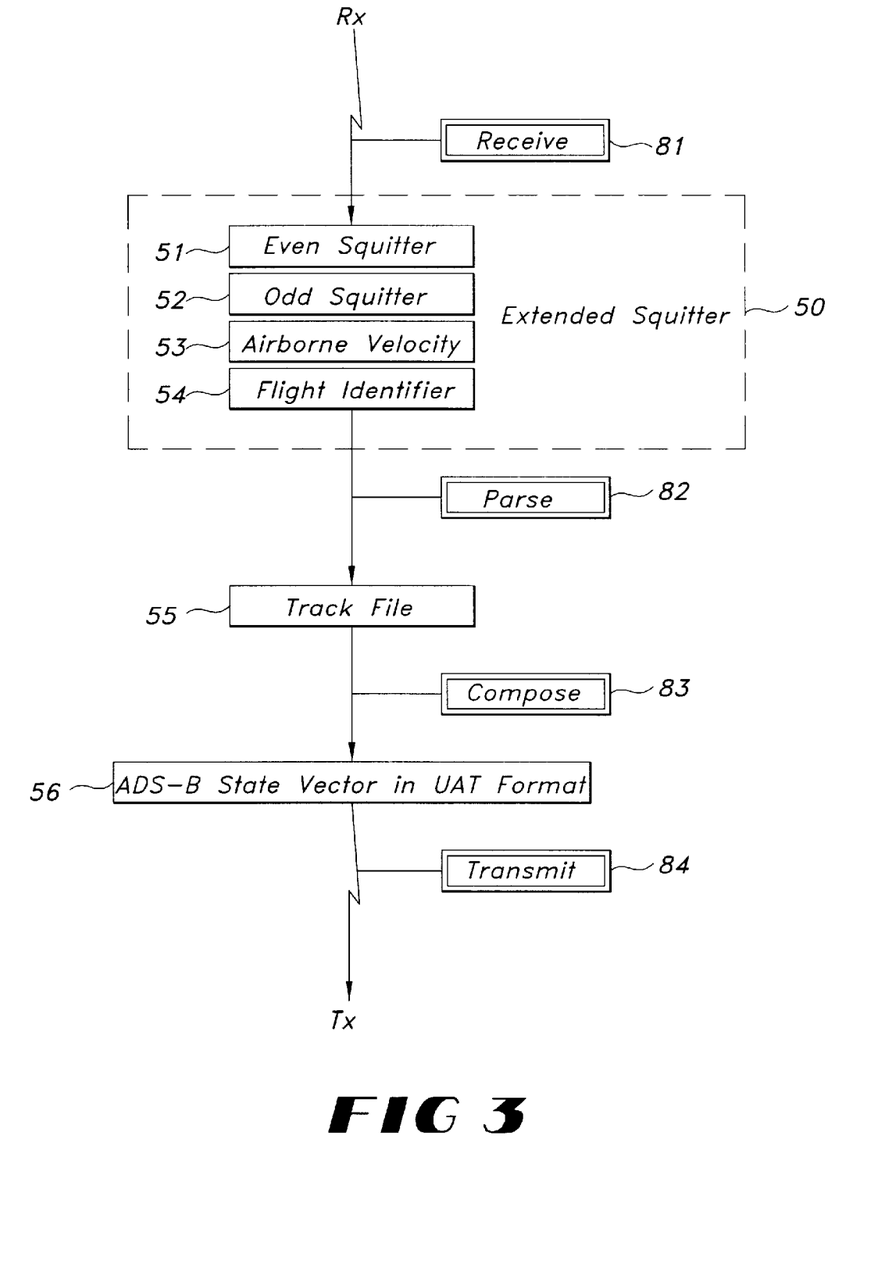
FIG. 3 is a flow chart illustrating the translation of a series of incoming Mode S extended squitters into an ADS-B state vector for transmission over a UAT datalink system, in accordance with an embodiment of the present invention.

In another aspect, shown in FIG. 3, the transceiver system 110 of the present invention translates an extended squitter 50 in a first format (such as Mode S format) into an ADS-B state vector 56 in a second format (such as UAT format) for broadcast to ADS-B-equipped aircraft. The present invention receives an incoming signal in a first format and translates it into an outgoing signal in a second format that is compatible with the transmitter. The outgoing signal may be translated into UAT format when using the present invention with a Universal Access Transceiver. Alternatively, the outgoing signal may be translated into another second format that is compatible with another known transceiver system.

An ADS-B signal that is transmittable and ready for broadcast by a UAT datalink system generally includes an ADS-B state vector in UAT format 56. The phrase "in UAT format" indicates an ADS-B signal that has been formatted to conform to the standard format for messages transmitted via a UAT datalink system, such as those standards promulgated by the RTCA organization.

In one aspect of the method of the present invention, the extended squitter 50 is received 81 by the receiver 15, parsed 82 into a track file 55, and composed 83 into an ADS-B state vector in UAT format 56, which is transmitted 84 by the transceiver 115. The phrase "processing a squitter" generally includes all the steps of handling an incoming squitter, from receipt through transmission.

Generally, at least four segments of a Mode S extended squitter 50 are required to acquire the data needed to compose an ADS-B state vector 56. The first two segments needed contain position data, transmitted using an even squitter 51 and an odd squitter 52. The third squitter segment contains airborne velocity 53 (sub-type 1). The fourth segment contains a flight identifier 54 and includes the type of aircraft broadcasting the signal.

These four Mode S extended squitter segments 51, 52, 53, 54 are required in order to assemble a complete ADS-B state vector 56. In an environment with a high degree of interference, receipt of all four segments 51, 52, 53, 54 may take several seconds. In one aspect of the method of the present invention, the extended squitter 50 will be rejected unless both position squitters 51, 52 are received within a time limit. In other words, the extended squitter 50 will be accepted for translation by the transceiver system 110 only if the even squitter 51 and the odd squitter 52 are received within a time limit. In one embodiment, this time limit may be ten seconds, which is the limit set forth in the standards for Mode S services promulgated by the International Civil Aviation Organization (ICAO).

The receive 81, parse 82, compose 83, and transmit 84 steps shown in FIG. 3 can be performed in one embodiment by the transceiver system 110 shown in FIG. 1. In one aspect of the method of the present invention, the receiver 15 (through its antenna 12) receives 81 the extended squitter 50. The bits of data contained within the squitter 50 may be shared with the second processor 20 through a one-way direct memory access (DMA) connection 17. One skilled in the art will appreciate and understand the shared-memory architecture provided by DMA connections.

The second processor 20 is configured to parse 82 the extended squitter 50 into its component data. Each squitter segments contains bits of data. The term "parse" as used in this application means to divide the squitter 50 into its component parts and to maintain those parts in an accessible format. The accessible format may be a track file 55 containing the data. Thus, the term "parse" may include the storing of each of the extracted bits in a track file 55. The track file 55 contains the data gathered about a particular target or aircraft being tracked. The track file 55 may be temporary. Several track files 55 may exist simultaneously.

The second processor 20 (sometimes referred to as the squitter processor) may be connected to the first processor 100 by a direct memory access (DMA) connection 27. The DMA connection 27 provides an open link between the two processors 20, 100 for sharing data and information. The processors 20, 100 are configured to compose 83 an ADS-B state vector in UAT format 56 using the bits stored in the track file 55. In one embodiment, the second processor 20 may parse 82 the squitter 50 and may house the stored track file 55, whereas the first processor composes the state vector 56.

In an alternative embodiment, the second processor 20 parses the squitter 50 and composes the state vector 56, which may be shared with the first processor 100 through the DMA connection 27. The creation of the ADS-B state vector 56 may take place within either or both processors 20, 100.

To compose 83 an ADS-B state vector in UAT format 56, the method of the present invention follows the protocols and standards governing the order and formatting of data in a UAT signal, such as those promulgated by RTCA and/or the International Civil Aviation Organization (ICAO). The composing step 83 involves packing the bits of data from the track file 55 into the proper order, and in the standard UAT format, to create an ADS-B state vector 56 that is recognizable and compatible with UAT datalink systems 30.

Transmission of the ADS-B state vector in UAT format 56 is facilitated by a serial connection 37 to the transceiver 115 in the UAT system 210. The serial connection 37 acts as a high-speed link between the first processor 100 and the transceiver 115. One skilled in the art will understand and appreciate the usefulness of a serial connection 37 in this context. The transmit 84 step of the method is accomplished by the transceiver 115, through its antenna 112.

Redundant Signals

As shown in FIG. 2, dual-equipped aircraft 65 broadcast both a UAT-format signal 35 and a Mode S extended squitter 50. It should be understood that UAT-format ADS-B signals 35 and extended squitters 50 both contain aircraft identifiers 54 so that, as soon as the signals are received, the transceiver system 110 will understand that both signals originate from the same dual-equipped aircraft 65.

In another aspect of the method of the present invention, the processors 100, 20 are configured to suspend the translation of a squitter 50 received from an aircraft when a UAT-format ADS-B signal 35 has been received from the same aircraft. The term "suspend" should be understood to mean that the process of translating that particular squitter is halted or stopped temporarily, as long as the squitter's aircraft identifier 54 matches the ADS-B signal's aircraft identifier 54. Composing an ADS-B state vector 56 from the squitter 50 would create a redundant signal that might compete within the channel bandwidth. In this aspect, the invention eliminates the broadcast of redundant signals and minimizes confusion and clutter.

It will be appreciated by one skilled in the art that a transceiver system 110 as described herein may be realized in many different manners consistent with the spirit and scope of the present invention. Therefore, it will be further appreciated that the transceiver system 110 as described herein supports a corresponding apparatus and methodology. In addition, the transceiver system 110 may be implemented in software, hardware, or a combination of software and hardware, as will be appreciated by one skilled in the art, who will further appreciate that the system 110 supports a corresponding system based upon a computer device and associated computer software.

Many modifications and alternative embodiments of the present invention will come to mind when one skilled in the art receives the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are used and details are shown herein, they are used in a generic and descriptive sense only, and not for purposes of limitation.

What is claimed is:

1. An apparatus for processing a squitter received from a vehicle, comprising:
   a receiver configured to receive a squitter from a vehicle;
   a processor in communication with said receiver and configured to translate said squitter into a transmittable ADS-B signal; and
   a transmitter in communication with said processor and configured to transmit said ADS-B signal.

2. An apparatus according to claim 1, wherein said squitter is an extended squitter from a Mode S transponder.

3. An apparatus according to claim 1, wherein said transmittable ADS-B signal comprises an ADS-B state vector in UAT format.

4. An apparatus according to claim 1, wherein said processor comprises one or more processors in communication with said receiver and said transmitter.

5. An apparatus according to claim 1, wherein said processor is further configured to receive traffic data from fixed ground radar stations and said transmitter is further configured to transmit said traffic data.

6. An apparatus according to claim 1, wherein said transmitter is a Universal Access Transceiver configured to receive and transmit ADS-B signals in UAT format.

7. An apparatus according to claim 6, wherein said processor is further configured to suspend translation of a squitter received from a target when a UAT signal is also received from said target.

8. An apparatus for translating a Mode S extended squitter into an ADS-B state vector, said apparatus in communication with a transceiver system, the transceiver system characterized by a transceiver and a first processor, said apparatus comprising:
   a receiver configured to receive an extended squitter from a vehicle; and
   a second processor in communication with said receiver and with said first processor, said second processor configured to parse said squitter into its component data and compose an ADS-B state vector using said data.

9. An apparatus according to claim 8, wherein said first processor is configured to cooperate with said second processor to parse said squitter into its component data.

10. An apparatus according to claim 8, wherein said first processor is configured to cooperate with said second processor to compose said ADS-B state vector using said data.

11. An apparatus according to claim 8, wherein said extended squitter comprises a plurality of segments.

12. An apparatus according to claim 8, wherein said second processor stores said component data in a track file.

13. An apparatus according to claim 8, wherein said second processor composes said ADS-B state vector in UAT format.

14. A method for processing a squitter received from a vehicle, comprising:
   receiving a squitter from a vehicle via a receiver;
   translating said squitter into a transmittable ADS-B signal using a processor in communication with said receiver; and
   transmitting said ADS-B signal via a transmitter in communication with said processor.

15. A method according to claim 14, wherein said step of translating said squitter further comprises:
   parsing said squitter into its component data; and
   composing a transmittable ADS-B signal from said data.

16. A method according to claim 15, wherein said step of parsing said squitter further comprises storing said data in a track file.

17. A method according to claim 15, wherein said step of composing a transmittable ADS-B signal further comprises composing said ADS-B signal in UAT format.

18. A method according to claim 17, further comprising:
   suspending the translation of a squitter received from a target when a UAT signal is also received from said target.

19. A method for translating a Mode S extended squitter into an ADS-B state vector within a transceiver system, the transceiver system characterized by a receiver, a processor, and a transmitter, said method comprising:
   receiving a squitter from a vehicle via said receiver;
   parsing said squitter into its component data using said processor;
   composing an ADS-B state vector from said data using said processor; and
   transmitting said ADS-B state vector via a transmitter in communication with said processor.

20. A method according to claim 19, wherein said step of parsing said squitter further comprises storing said data in a track file.

21. A method according to claim 19, wherein said step of composing an ADS-B state vector further comprises composing said ADS-B state vector in UAT format.

22. A method according to claim 19, wherein said processor comprises one or more processors.

23. A method according to claim 22, wherein said processors are configured to cooperate to parse said squitter into its component data.

24. A method according to claim 22, wherein said processors are configured to cooperate to compose said ADS-B state vector using said data.

25. A method according to claim 19, wherein said transmitter is a Universal Access Transceiver configured to receive and transmit ADS-B signals in UAT format.

26. A method according to claim 25, further comprising:
   suspending the translation of a squitter received from a target when a UAT signal is also received from said target.

27. A system for processing a squitter received from a vehicle, comprising:
   a vehicle equipped with an onboard transmitter;
   a receiver configured to receive a squitter from said onboard transmitter;
   a computer processing device in communication with said receiver, said computer device comprising:

a first processing portion configured to parse said squitter into its component data; and a second processing portion configured to compose a transmittable ADS-B signal using said data; and a transmitter in communication with said processor and configured to transmit said ADS-B signal.

28. A system according to claim 27, wherein said computer processing device comprises one or more computer processing devices in communication with said receiver and said transmitter.

29. A system according to claim 28, wherein said computer processing devices are configured to cooperate to execute said first and second processing portions.

30. A system according to claim 27, wherein said transmitter is a Universal Access Transceiver configured to receive and transmit ADS-B signals in UAT format.

31. A system according to claim 30, wherein said computer processing device further comprises:

a third processing portion configured to suspend translation of a squitter received from a target when a UAT signal is also received from said target.

32. A system according to claim 27, wherein said computer processing device further comprises:

a traffic processing portion configured to receive traffic data from fixed ground radar stations; and a broadcast processing portion configured to direct said transmitter to transmit said traffic data.

33. A computer software program product translating a Mode S extended squitter into an ADS-B state vector in a system having a transceiver component, the transceiver component characterized by a receiver, a processor, and a transmitter, said product comprising:

a first executable portion configured to parse said squitter into its component data; and a second executable portion configured to compose an ADS-B state vector from said data.

34. A computer software program product according to claim 33, wherein said first executable portion further comprises a sub-portion configured to store said data in a track file.

35. A computer software program product according to claim 33, further comprising:

a third executable portion configured to compose said ADS-B state vector in UAT format.

36. A computer software program product according to claim 33, further comprising:

a fourth executable portion configured to suspend translation of a squitter received from a target when a UAT signal is also received from said target.

37. A method of integrating a squitter translator into a transceiver system, comprising:

adding a receiver configured to receive a squitter in a first format from a vehicle;

adding a squitter processor in communication with said receiver; and linking said squitter processor to said transceiver system such that said squitter is parsed into its component data and an ADS-B signal in a second format is composed using said data, said second format compatible with said transceiver system.

38. A translator module for use with a transceiver system, comprising:

a receiver configured to receive a squitter in a first format from a vehicle; and a squitter processor in communication with said receiver and including a link configured to be connected for data communication with said transceiver system, said squitter processor being configured to translate said squitter into an ADS-B signal in a second format, said second format compatible with said transceiver system.

39. A module according to claim 38, wherein said squitter processor is further configured to parse said squitter into its component data and to compose said ADS-B signal using said data.

* * * * *

UNITED STATES PATENT AND TRADEMARK OFFICE
CERTIFICATE OF CORRECTION

PATENT NO. : 6,545,631 B2
DATED : April 8, 2003
INVENTOR(S) : Hudson et al.

It is certified that error appears in the above-identified patent and that said Letters Patent is hereby corrected as shown below:

Title page,
Item [56], References Cited, U.S. PATENT DOCUMENTS, insert the following:

| | | | | |
|---|---|---|---|---|
| -- 3,887,916 | A | 6/1975 | Goyer | 343/6.5 LC |
| 4,063,073 | A | 12/1977 | Strayer | 364/439 |
| 4,196,474 | A | 4/1980 | Buchanan, et al. | 364/461 |
| 4,639,730 | A | 1/1987 | Paterson, et al. | 340/970 |
| 4,646,244 | A | 2/1987 | Bateman, et al. | 364/461 |
| 4,746,924 | A | 5/1988 | Lightfoot | 342/453 |
| 4,782,450 | A | 11/1988 | Flax | 364/461 |
| 4,789,865 | A | 12/1988 | Litchford | 342/455 |
| 4,835,537 | A | 5/1989 | Manion | 342/30 |
| 4,839,658 | A | 6/1989 | Kathol, et al. | 342/455 |
| 4,853,700 | A | 8/1989 | Funatsu, et al. | 342/30 |
| 4,891,650 | A | 1/1990 | Sheffer | 342/457 |
| 4,896,154 | A | 1/1990 | Factor, et al. | 340/995 |
| 4,914,733 | A | 4/1990 | Gralnick | 340/961 |
| 4,951,056 | A | 8/1990 | Cope, et al. | 342/29 |
| 4,980,683 | A | 12/1990 | O'Sullivan, et al. | 340/961 |
| 5,025,382 | A | 6/1991 | Artz | 364/439 |
| 5,077,673 | A | 12/1991 | Brodegard, et al. | 364/461 |
| 5,111,400 | A | 5/1992 | Yoder | 364/424.01 |
| 5,153,836 | A | 10/1992 | Fraughton, et al. | 364/461 |
| 5,157,615 | A | 10/1992 | Brodegard, et al. | 364/461 |
| 5,179,377 | A | 1/1993 | Hancock | 340/961 |
| 5,185,606 | A | 2/1993 | Verbaarschot, et al. | 340/961 |
| 5,200,902 | A | 4/1993 | Pilley | 364/439 |
| 5,202,690 | A | 4/1993 | Frederick | 342/26 |
| 5,208,591 | A | 5/1993 | Ybarra, et al. | 340/961 |
| 5,227,786 | A | 7/1993 | Hancock | 340/961 |
| 5,265,024 | A | 11/1993 | Crabill, et al. | 364/443 |
| 5,285,380 | A | 2/1994 | Payton, et al. | 364/174 |
| 5,355,442 | A | 10/1994 | Paglieroni, et al. | 395/127 |

UNITED STATES PATENT AND TRADEMARK OFFICE
CERTIFICATE OF CORRECTION

PATENT NO. : 6,545,631 B2
DATED : April 8, 2003
INVENTOR(S) : Hudson et al.

It is certified that error appears in the above-identified patent and that said Letters Patent is hereby corrected as shown below:

<u>Title page,</u>
Item [56], References Cited, U.S. PATENT DOCUMENTS, insert the following:

| | | | | |
|---|---|---|---|---|
| 5,381,140 | A | 1/1995 | Kuroda, et al. | 340/961 |
| 5,420,968 | A | 5/1995 | Johri | 395/133 |
| 5,442,556 | A | 8/1995 | Boyes, et al. | 364/433 |
| 5,446,465 | A | 8/1995 | Diefes, et al. | 342/357.08 |
| 5,450,329 | A | 9/1995 | Tanner | 364/449 |
| 5,493,309 | A | 2/1996 | Bjornholt | 342/455 |
| 5,519,392 | A | 5/1996 | Oder, et al. | 340/995 |
| 5,548,515 | A | 8/1996 | Pilley, et al. | 364/439 |
| 5,574,648 | A | 11/1996 | Pilley | 364/439 |
| 5,596,332 | A | 1/1997 | Coles, et al. | 342/455 |
| 5,604,504 | A | 2/1997 | Nail | 342/417 |
| 5,636,123 | A | 6/1997 | Rich, et al. | 364/461 |
| 5,638,282 | A | 6/1997 | Chazelle, et al. | 364/461 |
| 5,677,841 | A | 10/1997 | Shiomi, et al. | 364/439 |
| 5,760,737 | A | 6/1998 | Brenner | 342/357 |
| 5,781,146 | A | 7/1998 | Frederick | 342/26 |
| 5,838,262 | A | 11/1998 | Kershner, et al. | 340/945 |
| 5,839,080 | A | 11/1998 | Muller, et al. | 701/9 |
| 5,867,804 | A | 2/1999 | Pilley, et al. | 701/120 |
| 5,872,526 | A | 2/1999 | Tognazzini | 340/961 |
| 5,883,586 | A | 3/1999 | Tran, et al. | 340/945 |
| 5,884,223 | A | 3/1999 | Tognazzini | 701/301 |
| 5,892,462 | A | 4/1999 | Tran | 340/961 |
| 5,910,788 | A | 6/1999 | Class | 342/357 |
| 5,920,276 | A | 7/1999 | Frederick | 342/26 |
| 5,923,286 | A | 7/1999 | Divakaruni | 342/357 |
| 5,926,132 | A | 7/1999 | Brenner | 342/357 |
| 5,936,552 | A | 8/1999 | Wichgers, et al. | 340/963 |
| 5,945,926 | A | 8/1999 | Ammar, et al. | 340/970 |
| 5,969,668 | A | 10/1999 | Young, Jr. | 342/357 |
| 5,969,672 | A | 10/1999 | Brenner | 342/357.06 |
| 5,978,715 | A | 11/1999 | Briffe, et al. | 701/11 |

UNITED STATES PATENT AND TRADEMARK OFFICE
CERTIFICATE OF CORRECTION

PATENT NO.   : 6,545,631 B2
DATED        : April 8, 2003
INVENTOR(S)  : Hudson et al.

It is certified that error appears in the above-identified patent and that said Letters Patent is hereby corrected as shown below:

Title page (cont'd),

| | | | | |
|---|---|---|---|---|
| 5,995,038 | A | 11/1999 | Ikizyan | 342/91 |
| 5,999,116 | A | 12/1999 | Evers | 342/36 |
| 6,021,374 | A | 2/2000 | Wood | 701/301 |
| 6,094,169 | A | 7/2000 | Smith, et al. | 342/465 |
| 6,154,151 | A | 11/2000 | McElreath, et al. | 340/970 |
| 6,211,811 | B1 | 4/2001 | Evers | 342/36 |
| 2002/0021247 | A1 | 2/2002 | Smith, et al. | 342/450 |
| 6,384,783 | B1 | 5/2002 | Smith, et al. | 342/387 -- |

FOREIGN PATENT DOCUMENTS, insert the following:

| | | | |
|---|---|---|---|
| -- EP | 0 405 430 | A2 | 1/1991 |
| EP | 0 411 309 | A1 | 2/1991 |
| EP | 0 493 822 | A1 | 7/1992 |
| WO | WO-200041000 | A1 | 7/2000 -- |

OTHER PUBLICATIONS, insert the following:

-- Abbott, Terence S., et al., "Flight Investigation of Cockpit-Displayed Traffic Information Utilizing Coded Symbology in an Advanced Operational Environment;" July, 1980, pp. 1-28, NTIS; Springfield, Virginia.

Hart, Sandra G., et al., "Evaluation of the Potential Format and Content of a Cockpit Display or Traffic Information," *Human Factors,* October, 1980; pp. 591-604; 22(5); The Human Factors Society, Inc.

Drouilhet Jr., Paul R., "Air Traffic Control Development at Lincoln Laboratory," *The Lincoln Laboratory Journal,* 1989; pp. 331-44; Vol. 2, No. 3 (U.S.)

Gertz, J.L., "Multi-sensor Surveillance for Improved Aircraft Tracking," *The Lincoln Laboratory Journal,* 1989; pp. 381-96; Vol. 2, No. 3 (U.S.)

Harman, W.H., "TCAS: A System for Preventing Midair Collisions," *The Lincoln Laboratory Journal,* 1989; pp. 437-58; Vol. 2, No. 3 (U.S.)

Miura, Akira, et al., "Air Traffic Control Data Tables for Conflict Alert Systems;" *Electronics and Communications in Japan, Part 1;* 1996; pp. 101-13; Vol. 79, No. 6; translated from *Denshi Joho Tsushin Gakkai Ronbunshi;* Vol. 78-B-II, April 1995; pp. 240-49; 1996 Scripta Technica, Inc.; ISSN 8756-6621/0006-0101; XP 0005 88958.

UNITED STATES PATENT AND TRADEMARK OFFICE
CERTIFICATE OF CORRECTION

PATENT NO. : 6,545,631 B2
DATED : April 8, 2003
INVENTOR(S) : Hudson et al.

It is certified that error appears in the above-identified patent and that said Letters Patent is hereby corrected as shown below:

Title page (cont'd),

Strain, R.C., *et al.*, "Airborne Information Initiatives: Capitalizing on a Multi-Purpose Broadcast Communications Architecture," *14th Digital Avionics Systems Conference*, Nov. 5-9, 1995, pp. 510-16, Vol. Conf. 14, No. XP-000 753 662, IEEE, New York, NY.

Kilbourne, Todd, *et al.*, "Development of the Ground Broadcast Server at Memphis International Airport," *20th Digital Avionics Systems Conference*, Oct. 14-18, 2001, pp. 2.B.3-1 through 7, Vol. 1, No. XP-002 205 947, IEEE, Piscataway, NJ. --

Signed and Sealed this

Seventh Day of September, 2004

JON W. DUDAS
*Director of the United States Patent and Trademark Office*